United States Patent [19]
Nye

[11] 3,796,000
[45] Mar. 12, 1974

[54] DEPTH CONTROL DEVICE FOR FISH LURE

[76] Inventor: Norman H. Nye, 1348 Highbridge Rd., Cuyahoga Falls, Ohio 44223

[22] Filed: Apr. 4, 1973

[21] Appl. No.: 347,789

[52] U.S. Cl. .............................. 43/43.13, 43/42.22
[51] Int. Cl. ............................................ A01k 85/00
[58] Field of Search............ 43/43.13, 42.03, 42.22, 43/42.12

[56] References Cited
UNITED STATES PATENTS

| | | | |
|---|---|---|---|
| 2,665,512 | 1/1954 | Sullivan et al. | 43/43.13 X |
| 3,305,964 | 2/1967 | Wieszeck | 43/42.03 |
| 3,727,341 | 4/1973 | Nye | 43/43.13 |

FOREIGN PATENTS OR APPLICATIONS

| | | | |
|---|---|---|---|
| 745,508 | 2/1956 | Great Britain | 43/42.22 |

Primary Examiner—James H. Czerwonky
Attorney, Agent, or Firm—Oldham & Oldham Co.

[57] ABSTRACT

A device attachable to a fishing line to control a lure connected to the device so that the lure is maintained at a desired temperature level in a body of water. The device has an elongated body forming a keel and a bimetal strip extends parallel to the keel. A control fin or plate is rotatably carried on the keel in an inclined position and latch means connect between an end of the bimetal strip and the control plate to provide controllable 180° rotary movement thereof dependent upon the ambient temperature conditions and its effect on the bimetal control strip. The bimetal strip is cantilevered in a direction axially of the unit and it has a freely movable end engaging the latch for control action.

10 Claims, 4 Drawing Figures

PATENTED MAR 12 1974          3,796,000

DEPTH CONTROL DEVICE FOR FISH LURE

The invention relates to a depth control device, especially to a device for use in fishing actions for automatically controlling the position of the lure in or about desired water temperature zones and for maintaining the lure controlled by the device in optimum temperature water conditions for fishing action.

In bodies of water, various types of circulation of the water in the body may occur, depending upon the time of year, the temperature conditions to which the body of water is subjected, and various other factors. It is a well known fact, however, that a three level thermal stratification occurs in unfrozen bodies of water, especially in deeper lakes. The surface strata in the body of water is termed the epilimnion, an intermediate layer of water is called the thermocline, and the bottom layer is termed the hypolimnion. Appreciable temperature differentials exist between these three layers formed in a body of water but the layers usually blend together at their adjacent areas. Hence, there may be no extremely sharp temperature variations right at the thermocline marginal portions. It also is a known fact that in the hypolimnion layer, the oxygen content can become depleted by bacteria action and the oxygen content is not replenished by water circulation.

Hence, many particularly desirable types of cold water fish, such as trout, salmon, walleyed pike, etc. tend to feed and exist in or about the thermocline in a body of water because its temperature and oxygen conditions are most satisfactory for fish existence.

PRIOR ART

Reference is made to my own co-pending patent application Ser. No. 218,713, filed Jan. 18, 1972, now U.S. Pat. No. 3,727,341 as being one teaching of a fish lure control device based upon temperature control by the water in which a fishing action is desired.

An object of the present invention is to provide a novel and improved depth control device for use in fishing actions, and which depth control device is temperature responsive.

Another object of the invention is to make a relatively uncomplicated, sturdy device for use in fishing actions and which device controls the lure positioning in a body of water by water temperature conditions.

Another object of the invention is to make an efficient depth control device for use by fishermen wherein a lure can be fished in and about the thermocline strata of a lake or stream.

The foregoing and other objects and advantages of the invention will be made more apparent as the specification proceeds.

Reference is made to the accompanying drawings, wherein.

When referring to corresponding members shown in the drawings and identified in the specification, corresponding numerals are used to facilitate comparison therebetween.

PATENTABLE SUBJECT MATTER

The device of the invention comprises, as one embodiment thereof, an elongated frame member having two end portions which project upwardly from the frame in the normal position thereof and a center keel forming portion extending substantially the length of the member, and a fin means is rotatably positioned on one end portion of the frame means on an axis parallel to the axis of the keel portion, which fin means projects outwardly of the keel and frame member and is shaped and angled in position to cause rotation of such fin means as the device is moved through the water. A bimetal strip is secured as a cantilever to the other end portion of the frame member and temperature responsive latching means are carried by said one end of the member and engage the free end of the bimetal strip for temperature responsive control action of the latching means. Such latching means are movable between a first position engaging the fin means in an upwardly extending position and a second position engaging the fin means when in a downwardly inclined position to cause rise or fall of the device as being moved through a body of water.

Figure 1:
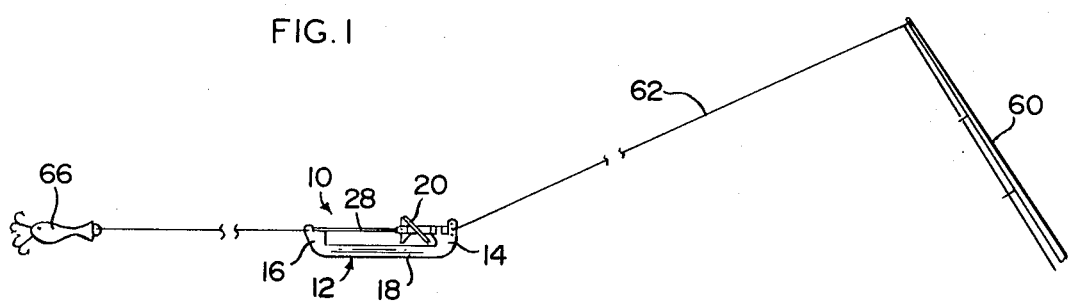
FIG. 1 is a somewhat diagrammatic elevation showing the depth control device of the invention as coupled with a fishing line and lure for fishing action.
Figure 2:
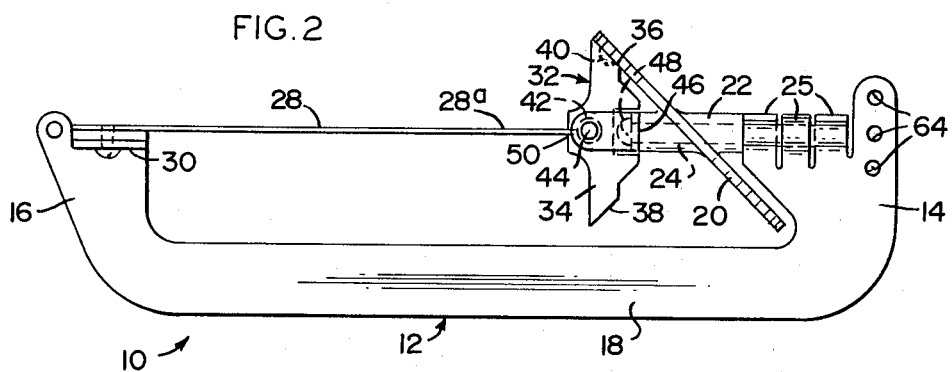
FIG. 2 is an enlarged side elevation of the depth control device of the invention.

Reference now is made to the details of the structure of the invention, and a device 10 is indicated, which device is adapted to be connected to a fishing line for securing a lure to the device and having the device and hence the lure be drawn through a body of water and be positioned in and about a preselected temperature zone in the water. The device comprises an elongated frame member 12 preferably formed from a thin metal plate of suitable composition and which frame member has end portions 14 and 16 one of which projects upwardly adjacent and from opposite ends of the frame 12. The portion of the frame member intermediate the end portions 14 and 16 comprises a center keel 18 that extends substantially the length of the member. The end portions 14 and 16 are considered to be extending upwardly from the keel, as indicated in FIG. 2 of the drawings. This is the normal operating position of the device.

Figure 3:
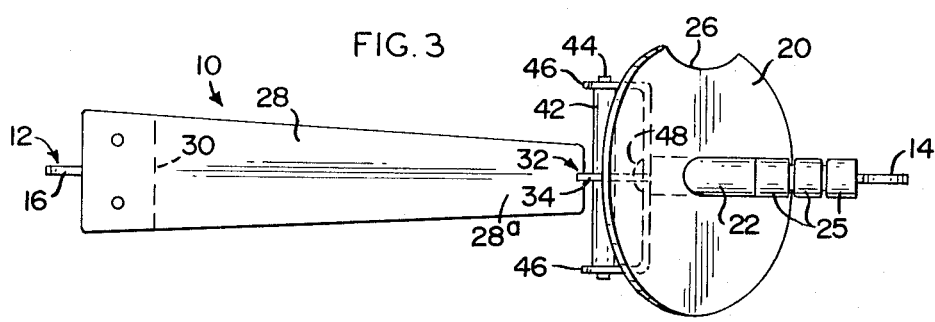
FIG. 3 is a plan view of the device of FIG. 2.

To aid in obtaining a variation in the depth of the device 10 when being towed through the water, an inclined means or member, such as a fin member 20 of generally oval shape is provided. This fin means or member 20 is mounted by a center sleeve 22 that is secured to and extends through a center portion of the fin. Such sleeve 22 is rotatably positioned on a fixed shaft or center pin 24 that is secured to one end portion 14 of the frame and extends axially into the device in spaced parallel relation to the keel 18 and its effective center line. Such shaft 24 is suitably secured to a fixed tubular section 25 provided in the end portion 14 to extend as a cantilever therefrom toward the opposite end of the frame 12. The sleeve 22 can be formed from any suitable material and any desired low friction rotatable connection or bearing means can be provided between the sleeve 22 and shaft 24. The fin 20, as best shown in FIG. 3, is normally positioned at an angle in relation to the axis of the shaft 24 and that of the device 10, and with the fin member having a cut-out section or portion 26 or equivalent formed therein whereby the fin means is not balanced in relation to the sleeve 22 but will have uneven forces set up thereon to aid in causing rotation of the fin means as the device is pulled through the water during the fishing action. Naturally this inclined fin member 20 projects outwardly from the center plane of the device 10 to provide sufficient surface area for controlling the depth at which the device 10 will move through the water.

Another important element of the present invention to aid in obtaining a temperature responsive control action in the device 10 is a bi-metal strip 28 which is secured at one end to a flange or bracket 30 formed on the end portion 16 of the frame. This flange 30 hence positions the strip 28 as a cantilever extending inwardly of the device and with the strip normally being substantially straight and parallel to the longitudinal axis of the device 10. The free end of the strip 28 will move up or down with temperature changes.

For temperature responsive action in the device 10, a latching means 32 is provided in the device. Such latching means 32 includes a latch device or plate 34 which has an angled upper edge or end 36 and an oppositely inclined lower end or edge 38 and wherein one of such edges or ends 36 or 38 is adapted to engage with any suitable dependent lug or projection 40 formed on the lower surface of the fin member 20, as hereinafter described. The ends 34 and 36 are complementary in shape to the adjacent surface of the fin 20. Specifically, the latch device 34 is pivotally carried on or is secured to a sleeve 42 that itself is pivotally carried on a shaft 44 extending between the bifurcated ends of a U-shaped bracket or member 46. Such U-shaped member 46 is suitably secured, as by a cap screw 48 or equivalent means, to the end of the shaft 24. Hence, the bracket or member 46 is fixedly positioned in the device, but with the actual latch device 34 being pivotal in a vertical plane on the center axis of the device 10.

Figure 4:
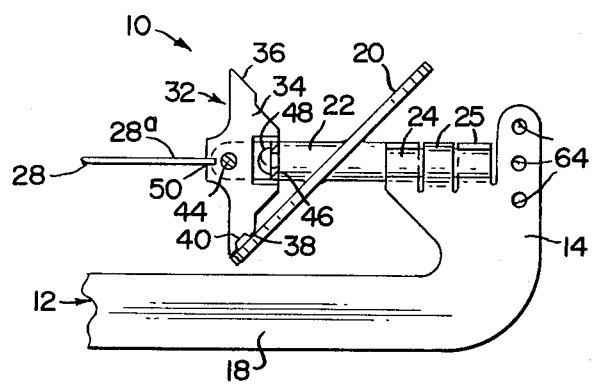
FIG. 4 is a fragmentary side elevation of the device of FIG. 2 with the depth control member therein in reversed position.

The action of the latch device 34 is temperature responsive through control by the bimetal strip 28 at its free end which seats in and engages a slot 50 formed in one vertically extending margin of such latch device. On temperature change, the free end 28a of the bimetal strip 28 will vary its vertical position slightly because of the strips inherent characteristics, the strip, by design, curving on a vertical axis with temperature variations. Thus, the latch device 34 can be changed by the strip 28 from a downwardly inclined position where the lower end 38 of the device engages the projection 40 on the fin member 20 (FIG. 4), or it will have the upper end of the latch device 34 being urged upwardly and clockwise (FIG. 2), releasing lower end 38 from engagement with projection 40 to subsequently engage such projection when the fin means 20 is in its upwardly inclined position through its rotation on shaft 24. At any time, hence, the latch device 34 will prevent rotation of the disc or fin in one direction and, upon release of the latch device from its engagement with the projection 40, then the fin member or disc 20 is released for a controlled 180° revolution in the device. This obviously changes the fin means from an upwardly and rearwardly inclined position as shown in FIG. 2 over to a downwardly and rearwardly inclined position as indicated in FIG. 4.

By drawing the device 10 through a body of water, hence, when it has moved to a suitable lower temperature condition, by the fin means when in the position shown in FIG. 2, then at that time, the bimetal strip 28 will be subjected to a temperature as to move the latch device 34 downwardly and counterclockwise and permit 180° controlled revolution of the fin member 20 on its positioning shaft. This then causes upwardly inclined movement of the device 10 and means connected thereto because of the relationship of the device to the water through which it is being pulled. Soon the device would move up out of the thermocline layer, the curvature of the strip 28 would end (or reverse) change the position of the latch device and the fin 20 would return to its FIG. 2 position to cause downward movement of the device back into the thermocline.

The drawings clearly show that a conventional fishing rod 60 can have a line 62 extending therefrom and engaging one of several apertures 64 formed in the end portion 14 of the frame of the device to connect it to the fishing line. The lure 66 connects to a suitable recess or hole at the opposite end portion 16 of the device whereby the position and level at which the fishing lure 66 operates will be varied intermittently by the device 10 moving the fishing lure either upwardly or downwardly in a body of water responsive to the temperature conditions in the thermal stratification layers formed in such body of water. The temperature conditions are such in the stratas formed in the bodies of water that, for instance, the top epilimnion layer may have a temperature in summertime of from about 65° or higher, while the thermocline layer would have upper and lower temperature limits of approximately from about 61° to 65° down to 41° to 40°. The bottom layer in the body of water normally is below or about at 39° temperature in most instances.

The device of the invention will function effectively to vary its position in a body of water so as to be in and about the thermocline layer in the water body at all times due to change in shape of the bimetal strip 28 and the control action effected thereby.

The device of the invention is relatively sturdy in construction and it is relatively inexpensive to make. Yet at the same time, the device will provide an effective temperature responsive control action for use in fishing, and particularly in trolling actions where the lure and the device 10 would be dragged or moved through the water by some propelling force. Hence, the objects of the invention are believed to be achieved.

While one complete embodiment of the invention has been disclosed herein, it will be appreciated that modification of this particular embodiment of the invention may be resorted to without departing from the scope of the invention.

What is claimed is:

1. A device adapted to be connected to a fishing line for positioning a lure in or about a preselected temperature zone in a body of water, comprising:

an elongated narrow metal plane frame means having end portions extending in parallel relation from a center portion thereof, which center portion forms a keel plate, a fishing line being connectable to one end portion and the lure being connectable to the other end portion;

a fin means projecting outwardly from and angled relative to the longitudinal axis of the frame means and positioned intermediate the ends thereof, means mounted at one end of said frame means for rotatably mounting said fin means for rotation on the means on an axis parallel to the longitudinal axis of the frame means, and temperature responsive latching means mounted on the device and operative to provide 180° rotation of the fin means relative to the keel plate under predetermined temperature operative conditions.

2. A device as in claim 1 and comprising said fin means having a dependent stop member thereon, said latching means including a vertically positioned latch plate with upper and lower ends for individually engaging said stop member when said fin means is in an upwardly and rearwardly inclined or a downwardly and forwardly inclined position, respectively, said fin means being adapted for rotation in only one direction.

3. A device as in claim 1 where said latching means include a latch plate positioned in a vertical plane for pivotal movement, a bimetal strip secured as a cantilever to the opposite end portion of said frame means and extending towards said fin means which is carried on the opposed end portion of said frame means, the free end of said strip engaging said latch plate to control the pivotal position thereof by the ambient temperature and the action of said latching means.

4. A device as in claim 2 where said latching means include a bimetal strip secured as a cantilever to said frame means and extending towards said fin means, the free end of said strip operatively engaging said latch plate at all times to control the pivotal position thereof by the ambient temperature and the action of said latching means, said strip being movable in a vertical plane.

5. A device as in claim 3 where the free end of said bimetal strip continuously engages said latch plate and said strip is movable in the same plane as said latch plate.

6. A device attachable to a fishing line to control a lure connected to the device so that the lure is maintained at a desired temperature level in a body of water and comprising an elongated body forming a keel for the unit, a bimetal strip mounted on the elongated body and extending parallel to the keel, a fin means rotatably and operably mounted on the elongated body near the keel in an inclined position, and latch means connected to the frame means between the free end of the bimetal strip and the fin means to provide controllable 180° rotary movement thereof dependent upon the ambient temperature conditions and its effect on the bimetal control strip.

7. A device as in claim 4 and comprising said fin means having a dependent stop member thereon, said latch means including a vertically positioned latch plate with upper and lower ends for individually engaging said stop member when said control plate is in an upwardly and rearwardly inclined or a downwardly and forwardly inclined position, respectively, said fin means being adapted for rotation in only one direction and functioning to provide upward or downward movement of the device when drawn through a body of water dependent on the position of said fin means.

8. A device as in claim 4 where said latch means include a latch plate positioned in a vertical plane for pivotal movement, said bimetal strip being secured as a cantilever to one end portion of said elongated body and extending towards said fin means, said fin means being mounted on the opposed end of said elongated body, said bimetal strip and fin means being on a common axis spaced from a center portion of said keel.

9. A device as in claim 6 where said elongated body is formed from a metal plate which normally defines a vertical plane when in operation, and said fin means extending laterally in both directions from said keel.

10. A device as in claim 5 where said latch plate is pivotally positioned on a U-shaped bracket by a shaft extending between the bifurcated ends of said bracket, said bracket being secured to said elongated body, said latch plate having its pivotal movement limited by engaging said fin means.

* * * * *